(No Model.)

C. L. SMITH.
VARIABLE SPEED MOVEMENT.

No. 299,590. Patented June 3, 1884.

Witnesses:
A. B. Howland.
J. H. Shutt.

Inventor:
Charles L. Smith
By Joseph Smith
Attorney

UNITED STATES PATENT OFFICE.

CHARLES L. SMITH, OF JAMESTOWN, NEW YORK.

VARIABLE-SPEED MOVEMENT.

SPECIFICATION forming part of Letters Patent No. 299,590, dated June 3, 1884.

Application filed March 29, 1884. (No model.)

*To all whom it may concern:*

Be it known that I, CHARLES L. SMITH, a citizen of the United States, residing at Jamestown, in the county of Chautauqua and State of New York, have invented a new and useful Variable-Speed Movement, of which the following is a specification.

My invention relates to machines where it is required in a close and compact form to change the relative speed of one pulley or shaft to another, or, in other words, where the number of revolutions of the driven shaft may be required to bear a changing ratio with the revolution of the driving-shaft, my object being to construct a mechanical device whereby this may be done without stopping the machine. I accomplish this by the device illustrated in the accompanying drawings, in which—

Figure 2:
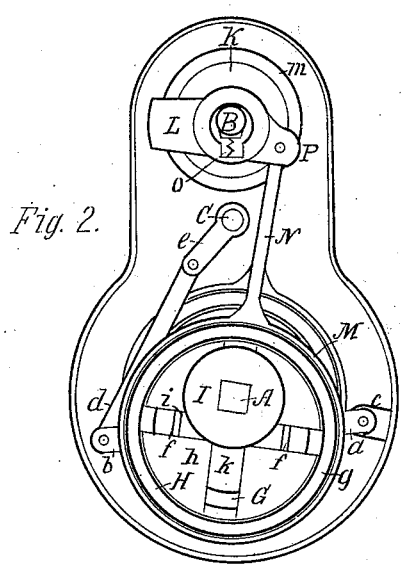
Figure 1:
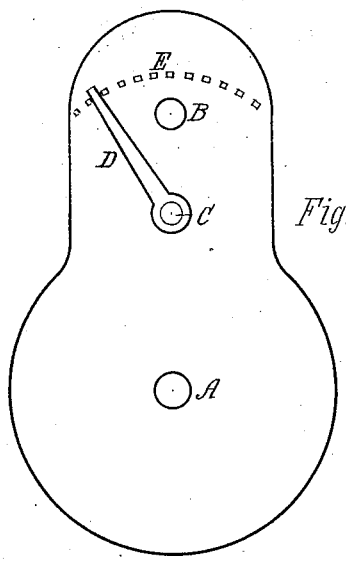

Figure 1 is merely the outside view of the case containing my device, showing the driving-shaft, the driven shaft, and the index-lever or guide for regulating the comparative revolutions of the two. Fig. 2 is a view of my device as seen with the cover of the case removed. Figs. 3, 4, 5, and 6 are views of detached portions of my device for procuring variable eccentric motion on the driving-shaft, and Fig. 7 a view of the clutch on the pulley of the driven shaft.

Similar letters in the several views indicate the same parts.

A is the driving-shaft; B, the driven shaft, the speed of which requires to have a changing ratio with the speed of the shaft A. C is a pinion or shaft connected with the link-motion, for controlling the throw of the variable eccentrics on the shaft A, and D the index or lever for turning the shaft C. E is a ratchet or rack for holding the index-lever D in any required position.

Figure 3:
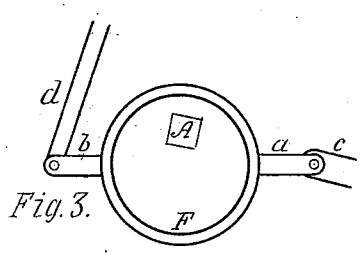
Figure 5:
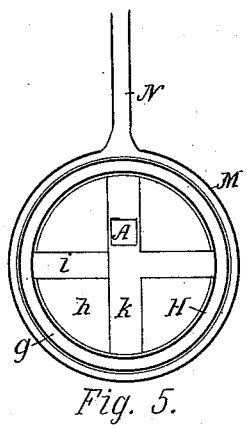
Figure 4:
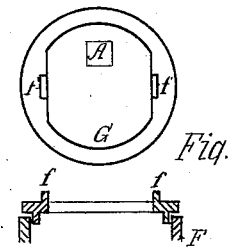

My device for producing an eccentric on the shaft A is as follows:

F, Fig. 3, is a ring having on its opposite sides the arms $a$ and $b$, the arm $a$ being hinged to the stud $c$, which is firmly attached to the case and is immovable; and $b$ is hinged to the rod $d$, which extends to and is hinged to the arm $e$, which projects from the regulating-shaft C. The distance from the pivotal point of connection of the arm $a$ and the stud $c$ to the center of the ring F must be the same as from the pivotal point to the center of the shaft A, and the length of the rod $d$ such as that at one extreme position of the arm $e$ the center of the ring F shall be brought to coincide with the center of the shaft A.

G is a ring (shown in Fig. 4 in plan and vertical section) fitted to work inside of and having a lip lying over the ring F. On its upper surface, and on the opposite sides of its periphery, are the two upturned studs $f$, fitted to slide in a slot in the eccentric H, hereinafter described. The ring G revolves freely inside of and upon the ring F, but must remain concentric with it.

Figure 6:
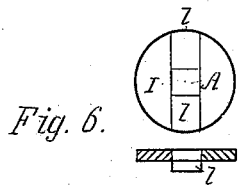
Figure 7:
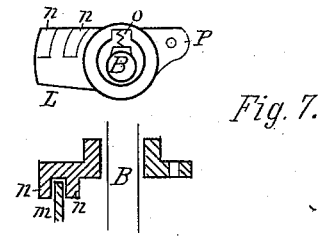

H (shown in Fig. 5) is the eccentric ring. This is of greater diameter than the rings F and G by at least as much as any required throw and is constructed of the rim $g$, plain, and inside the rim the depressed diaphragm $h$, which diaphragm has the slots $i$ and $k$ at right angles to each other. This ring lies over and on the ring G, the studs $f$ entering the slot $i$, which compels the ring G to rotate with the ring H, but allows a lateral motion of the ring H on the ring G in one direction, the studs $f$ sliding back and forth in the slot $i$. The right-angle slot $k$ passes over the driving-shaft A, (which is here square.) On the driving-shaft A is now placed the collar I, (a plan of the under side and a vertical section being shown in Fig. 6,) which has a square hole in the middle, fitting closely to the shaft A and revolving with it. This collar must be of as much smaller diameter than the inside of the rim $g$ of the eccentric ring H as any required throw of the eccentric, and has on its under side the studs or projections $l$, fitting into the slot $k$ on each side of the shaft A. This compels the eccentric ring H to revolve with the shaft A, but allows of a lateral motion along the slot $k$. It will now be seen that when the shaft A is revolved the collar I is revolved and is concentric with it. The eccentric ring H is also revolved; but as it has liberty of motion along the slot $k$, it is not necessarily always concentric. The ring G is also revolved; but its motion is concentric with the ring F as it revolves, the studs $f$ sliding back and forth in the slot $i$. The eccentric ring H now being revolved between the fixed collar I and the fixed ring G, the studs *l* playing in the slots *k* and the studs *f* playing in the right-angled slot *i* at each quarter-revolution of the shaft A, the center of the ring H is brought alternately with the center of the ring F and the shaft A, thus giving an eccentric throw to the ring H at each half-revolution equal to the distance between the centers of the ring F and the shaft A. As the ring F is adjustable by the manipulation of the index-lever D and shaft C, this distance may be adjusted to any point, and the throw of the eccentric increased or diminished at will; or by bringing the ring F concentric with the shaft A the revolution of all the parts is concentric and the throw ceases. On the driven shaft B, inside the case, is placed the pulley K, having the raised rim *m*. Over the shaft B is placed the locking-arm L, having on its under side the lugs *n n*, fitted to embrace the rim *m* of the pulley K. (The under side of the locking-rim and a vertical section are shown in Fig. 7.) The locking-arm fits loosely around the shaft B, and is held against it on the one side by the spring O. The lugs *n n* are so fitted that when the arm is held against the shaft B by the spring they compress the rim *m* of the pulley K; but when the other end of the arm is pressed up against the spring they yield and slip back upon the rim. Around the eccentric ring H is placed the strap M, and to this is attached the eccentric-rod N, the other end of this rod being connected to the end P of the locking-arm L opposite to the lugs *n n*. Now, when the shaft A is set in motion, the throw of the eccentric H is communicated through the rod N to the locking-arm L, giving it a vibratory motion. As it is drawn down against the shaft B, the lugs *n n*, engaging with the rim *m* of the pulley K, carry it forward part of a revolution. Upon the return-stroke of the eccentric the locking-arm is pressed against the spring O, which yields, allowing the lugs *n n* to slip back upon the rim *m* and get a new hold.

In the description of the construction of the eccentric and the remainder of the device I have described but one side. A precisely similar arrangement is placed on the opposite side of the ring F and the pulley K, only that the two eccentrics work directly opposite each other, and the locking-arm is reversed, so that it grips the rim *m* on the same side of the pulley K, and so that when the arm on the one side has carried the pulley forward the arm on the opposite side grips it and carries it still forward while the first arm is on the return-stroke. It is now seen that at every revolution of the driving-shaft A the pulley K is carried forward part of a revolution, and that this may be greater or less as the throw of the eccentric is greater or less; and as the throw of the eccentric may be increased or diminished by the manipulations of the index-lever D, the rotation of the shaft B may be made fast or slow, or to cease altogether, and this may be done while the machine is in motion.

I claim as my invention—

1. In a variable-speed movement, an eccentric upon the driving-shaft, constructed of an adjustable ring, F, and a second ring, G, revolving inside of and concentric with it, a fixed collar, I, upon the driving-shaft, and with the eccentric ring H between the fixed collar I and the ring G, all connected and operated as shown, whereby the throw of the eccentric ring H may be increased or diminished at will and while the machinery is in motion, substantially as described.

2. In a variable-speed movement, the adjusting-ring F, hinged to the case on the one side, and on the other connected by rods and shafts to the index-lever D, whereby the throw of the eccentric H may be increased or diminished by the operator at will and while the machinery is in motion, substantially as shown and described.

3. In a variable-speed movement, the locking-arm L, working loosely over the driven shaft B, and held in position against the shaft by a spring, O, and with lugs *n n*, so arranged as to grip the rim of a pulley on the driven shaft on the forward motion, but releasing the grip on the backward motion, of the arm, substantially as shown and described.

4. A mechanical device for producing a variable-speed movement, consisting of two or more adjustable eccentrics upon the driving-shaft, connected with and operating on two or more locking-arms, operating on a pulley on the driven shaft, the adjustable eccentrics and the locking-arms being constructed and connected together as described, the adjusting-ring of the eccentrics being connected with and controlled by the movement of the index-lever on the outside of the case, whereby the throw of the eccentric, and consequently the relative speed of the driven shaft, is varied at will by the operator while the machinery is in motion, all the parts working in combination, and constructed substantially as shown and described.

CHARLES L. SMITH.

Witnesses:
M. W. PARDEE,
C. B. JONES.